(12) United States Patent
Yokoyama et al.

(10) Patent No.: US 7,643,217 B2
(45) Date of Patent: Jan. 5, 2010

(54) VARIFOCAL LENS DEVICE

(75) Inventors: Kazuo Yokoyama, Osaka (JP); Atsushi Ono, Kyoto (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 12/160,125

(22) PCT Filed: Aug. 3, 2007

(86) PCT No.: PCT/JP2007/065276

§ 371 (c)(1),
(2), (4) Date: Jul. 7, 2008

(87) PCT Pub. No.: WO2008/018387

PCT Pub. Date: Feb. 14, 2008

(65) Prior Publication Data
US 2009/0002838 A1    Jan. 1, 2009

(30) Foreign Application Priority Data
Aug. 10, 2006  (JP) .............................. 2006-218235

(51) Int. Cl.
G02B 1/06  (2006.01)
G02B 3/12  (2006.01)
(52) U.S. Cl. ....................................... 359/665; 359/666
(58) Field of Classification Search .......... 359/665–667
See application file for complete search history.

(56) References Cited

U.S. PATENT DOCUMENTS 6,369,954 B1    4/2002  Berge et al.
7,545,430 B2 *  6/2009  Nakagawa ................... 359/666
2005/0002113 A1  1/2005  Berge

FOREIGN PATENT DOCUMENTS

| JP | 1-302301 | 12/1989 |
|---|---|---|
| JP | 2000-347005 | 12/2000 |
| JP | 2001-519539 | 10/2001 |
| JP | 2002-169110 | 6/2002 |
| JP | 2003-029005 | 1/2003 |
| JP | 2003-057410 | 2/2003 |
| JP | 2003-177219 | 6/2003 |
| JP | 2005-351971 | 12/2005 |

OTHER PUBLICATIONS

Patent Cooperation Treaty (PCT) International Preliminary Report on Patentability, issued Feb. 10, 2009.
International Search Report issued Oct. 16, 2007 in the International (PCT) Application of which the present application is the U.S. National Stage.

* cited by examiner

Primary Examiner—Evelyn A. Lester
(74) Attorney, Agent, or Firm—Wenderoth, Lind & Ponack, L.L.P.

(57) ABSTRACT

A first liquid and a second liquid are sealed in a cell, and the first liquid and the second liquid are not mixed with each other, and have different refractive indexes, with the interface of the two liquids being remained stationary by an edge portion of a movable opening member that is made in contact with the interface of the two liquids so that an actuator that is coupled to the movable opening member controls a shape of the interface of the two liquids by driving the movable opening member.

11 Claims, 11 Drawing Sheets

VARIFOCAL LENS DEVICE

TECHNICAL FIELD

The present invention relates to a varifocal lens device, and more particularly, concerns a lens device that drives the shape of a liquid interface by using an actuator so that the focal point is variably adjusted.

BACKGROUND ART

A lens device that allows one portion of a plurality of solid-state lens combined with one another to move in a light axis direction has been known as a typical conventional varifocal lens device. In this system, however, since the moving distance in the light axis direction is limited, it is difficult to make the device thinner, and, for this reason, a varifocal lens that us as a liquid lens capable of achieving a thinner structure has been proposed.

With respect to the conventional varifocal lens that uses a liquid lens, a structure has been proposed in which a liquid droplet, formed by an interface between two liquids having different refractive indexes, is used is a lens, with one of the liquids being made to have an ion conductive property and the other liquid being made to lave an insulating property, and by applying a voltage between an electrode placed on the interface of these two liquids and an opposing electrode placed in the ion conductive liquid, the shape of the droplet is changed. For example, Patent Document 1 has disclosed a liquid lens having this structure. Such a change in the shape of the two-liquid interface upon application of a voltage is made mainly based upon a driving principle in which the surface tension balances of liquid/liquid/solid (electrode) interfaces made of the two-liquid interface and the electrode are changed by the voltage application, and this phenomenon is referred to as an electro-wetting phenomenon. In a typical embodiment of Patent Document 1, the applied voltage is set to 250V, and a comparatively high voltage application is required.

Moreover, Patent Document 2 has disclosed another varifocal lens device that utilizes the electro-wetting phenomenon. In an attempt to achieve superior adjusting performances of the lens shape upon application of a voltage, this Patent Document has disclosed a structure in which, in order to reduce hysteresis and stick slip of the contact angle between the two-liquid interface, an insulating layer is formed on an electrode surface, with a lubricating layer that contacts with the liquid interface being formed thereon. In one example of the embodiments of Patent Document 2, a thin film of highly fluorinated polymer is formed on a polyimide dielectric layer. The change in contact angle of the two-liquid interface is simultaneously accompanied by position shifts among the liquid/liquid/solid interface line; therefore, the controlling operations need to be executed on the surface with sufficiently controlled wettability, and since the controlling operations depend on very small surface tension balances, the resulting system has an issue of weakness to disturbance due to an external force.

Patent Document 1: Japanese Patent Publication of Japanese translation of PCT International Application No. 2001-519539

Patent Document 2: Unexamined Japanese Patent Publication No. 2003-177219

DISCLOSURE OF INVENTION

Issues to be Solved by the Invention

In the varifocal lens device utilizing the electro-wetting phenomenon described in the Background of the Invention, since the controlling operations depend on very small surface tension balances, the resulting system has an issue of weakness to disturbance due to an external force.

Therefore, in order to solve the above-mentioned issues, an object of the present invention is to provide a varifocal lens device that can maintain the shape of a liquid lens stably from disturbance due to an external force.

Means for Solving the Issues

In order to achieve the above-mentioned objective, the present invention has the following arrangements.

According to the present invention, there is provided a varifocal lens device comprising:

a first liquid;

a second liquid that is capable of forming an interface with the first liquid without being mixed with the first liquid, and has a refractive index different from that of the first liquid;

a cell in which the first liquid and the second liquid are sealed;

an opening member that is shiftable in the cell, while being made in contact with the interface between the two liquids, with the interface between the first liquid and the second liquid being remained stationary by an edge portion thereof; and an actuator that is coupled to the opening member, for controlling a shape of the interface of the two liquids of a liquid lens formed in an opening portion of the opening member by allowing the opening member to shift so that a position of a focal point of the liquid lens is variably controlled.

EFFECTS OF THE INVENTION

As will be described below, in the present invention, the interface of the two liquids is remained stationary by the edge portion of the opening member that is kept in contact with the interface of the two liquids, and the actuator that is coupled to the opening member drives the opening member so as to control the shape of the interface of the two liquids so that the position of the focal point of the liquid lens is variably controlled, and in this structure, since the interface of the two liquids is remained stationary by the edge portion of the opening member, the shape of the liquid lens is effectively maintained stably from disturbance due to an external force.

Moreover, the varifocal lens utilizing the electro-wetting phenomenon, described in the Background of the Invention, has the defect that a comparatively high voltage application is required; however, in the pre sent invention, since no electro-wetting phenomenon requiring a high voltage upon driving is utilized, the lens car be driven by using an actuator of a low-voltage driving type, and the voltage raising circuit can be consequently omitted, thereby making it possible to provide a varifocal lens device of a power-saving type.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1A:
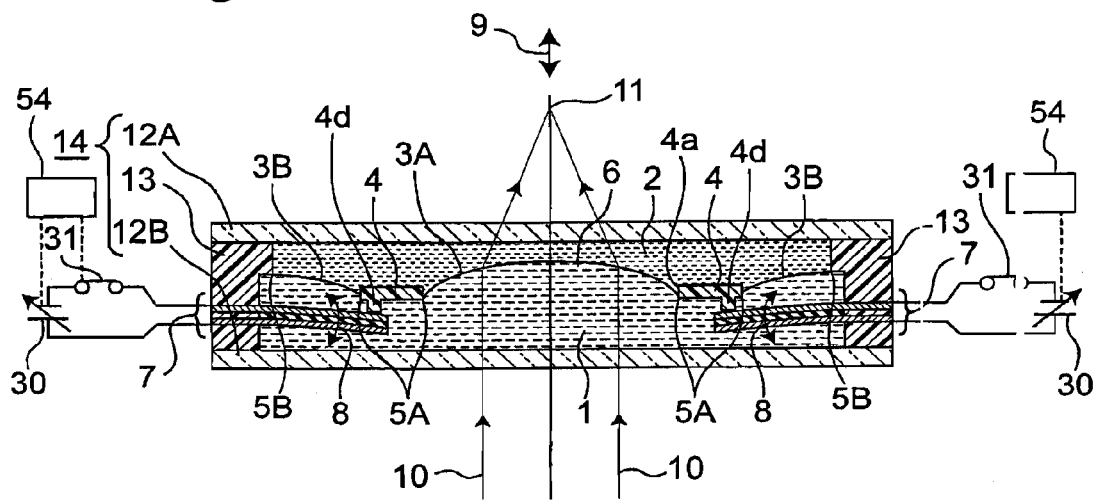
FIG. 1A is a cross-sectional view of a varifocal lens device in accordance with a first embodiment of the present invention.

Before the description of the present invention proceeds, it is to be noted that like parts are designated by like reference numerals throughout the accompanying drawings.

Prior to describing embodiments of the present invention by reference to the drawings, first, the following description will discuss various aspects of the present invention.

According to a first aspect of the present invention, there is provided a varifocal lens device comprising:

a first liquid;

a second liquid that is capable of forming an interface with the first liquid without being mixed with the first liquid, and has a refractive index different from that of the first liquid;

a cell in which the first liquid and the second liquid are sealed;

an opening member that is shiftable in the all, while being made in contact with the interface between the two liquids, with the interface between the first liquid and the second liquid being remained stationary by an edge portion thereof; and an actuator that is coupled to the opening member, for controlling a shape of the interface of the two liquids of a liquid lens formed in an opening portion of the opening member by allowing the opening member to shift so that a position of a focal point of the liquid lens is variably controlled.

In accordance with this arrangement, since the interface of the two liquids is remained stationery by the edge portion of the movable opening member that is made in contact with the interface of the two liquids, the shape of the liquid lens can be stably maintained from external disturbance due to an external force. Moreover, since an electro-wetting phenomenon that requires a high voltage upon driving is not utilized, the driving process is carried out by using an actuator of a low-voltage driving type.

According to a second aspect of the present invention, there is provided the varifocal lens device according to the first aspect, wherein the first liquid is a non-water soluble liquid, the actuator is a polymer actuator of an electric stimulation type, and the polymer actuator of an electric stimulation type is included in the first liquid that is non-water soluble.

In accordance with this arrangement, since a polymer actuator of an electric stimulation type, which is included in the first liquid having a non-water-soluble property, is used as the actuator, the polymer actuator can be operated under the environment from which moisture is shielded so that it is possible to prevent deterioration due to the presence of moisture, and consequently to provide an actuator that is superior in cycle life and reliability.

According to a third aspect of the present invention, there is provided the varifocal lens device according to the second aspect, wherein the first liquid that is non-water soluble is an ionic liquid and the polymer actuator of an electric stimulation type is an ion driving-type polymer actuator that is driven by incoming and outgoing anions or cations of the ionic liquid.

In accordance with this arrangement, the driving process can be carried out by using low voltage, and anions or cations, required for the driving operation, can be supplied from an ionic liquid corresponding to the first liquid, and since this liquid also serves as an electrolytic layer required for the actuator, it is possible to provide a convenient structure.

According to a fourth aspect of the present invention, there is provided the varifocal lens device according to the third aspect, wherein the first liquid that is non-water soluble is ethylmethyl imidazolium-trifluoromethane sulfonyl imide (EMI-TFSI).

In accordance with this arrangement, since the expansion and contraction of polymer derived from incoming and outgoing organic cations or anions having a comparatively large ionic radius can be utilized, it is possible to provide an actuator having a large positional change upon actuation.

According to a fifth aspect of the present invention, there is provided the varifocal lens device according to the second aspect, wherein the second liquid is water soluble, and the second liquid that is water soluble is an aqueous solution of a substance having a specific gravity higher than that of water.

In accordance with this arrangement, the density of the aqueous solution can be precisely adjusted by changing the concentration of the aqueous solution.

According to a sixth aspect of the present invention, there is provided the varifocal lens device according to the fifth aspect, wherein the second liquid that is water soluble is an aqueous solution of sodium polytungstate.

In accordance with this arrangement, an aqueous solution having a density in a wide range can be obtained from an ionic liquid having a comparatively high density.

According to a seventh aspect of the present invention, there is provided the varifocal lens device according to the first aspect, wherein the actuator is a polymer actuator of an electric stimulation type that has a thin plate shape and executes bending operations.

In accordance with this arrangement, by utilizing the feature of the liquid lens, that is, the fact that since the shift distance of the opening member required for a shape change in the interface of the two liquids is small, a thinner structure is achieved, it becomes possible to provide a varifocal lens device having a thin structure.

According to an eighth aspect of the present invention, there is provided the varifocal lens device according to the first aspect, wherein the first liquid, the second liquid, and the opening member have virtually the same density.

In accordance with this arrangement, it becomes possible to provide a varifocal lens device that can stably maintain the shape of the liquid lens from external disturbance due to an external force.

According to a ninth aspect of the present invention, there is provided the varifocal lens device according to the eighth aspect, wherein the opening member is a composite member made of a plurality of members having different densities.

In accordance with this arrangement, the density of the opening member can be precisely adjusted by changing the ratios of contents of a plurality of members having different densities.

According to a 10th aspect of the present invention, there is provided the varifocal lens device according to the first aspect, wherein the opening member is subjected to a surface treatment for applying water repellency or hydrophilicity thereto.

The resulting effect of this arrangement is that the interface of the two liquids remained stationary by the edge portion of the opening member is more stably remained stationary, and that the material of the opening member can be selected from a wider range.

According to an 11th aspect of the present invention, there is provided the varifocal lens device according to the first aspect, wherein the opening member has a round shape, a plurality of the actuators are disposed along tangent directions of the round opening member in a point-symmetrical pattern around a light axis of the liquid lens so that all the actuators are drive-controlled in synchronism with one another.

In accordance with this arrangement, since the opening member can be positively parallel-shifted in the light axis direction by the plurality of actuators, the shape of the interface between the two liquids of the liquid lens formed inside the opening portion of the opening member can be controlled with high precision so that the position of a focal point, formed by the liquid lens, can be variably adjusted with high precision.

Referring to the drawings, the following description will discuss embodiments of the present invention in detail.

First Embodiment

Figure 1B:
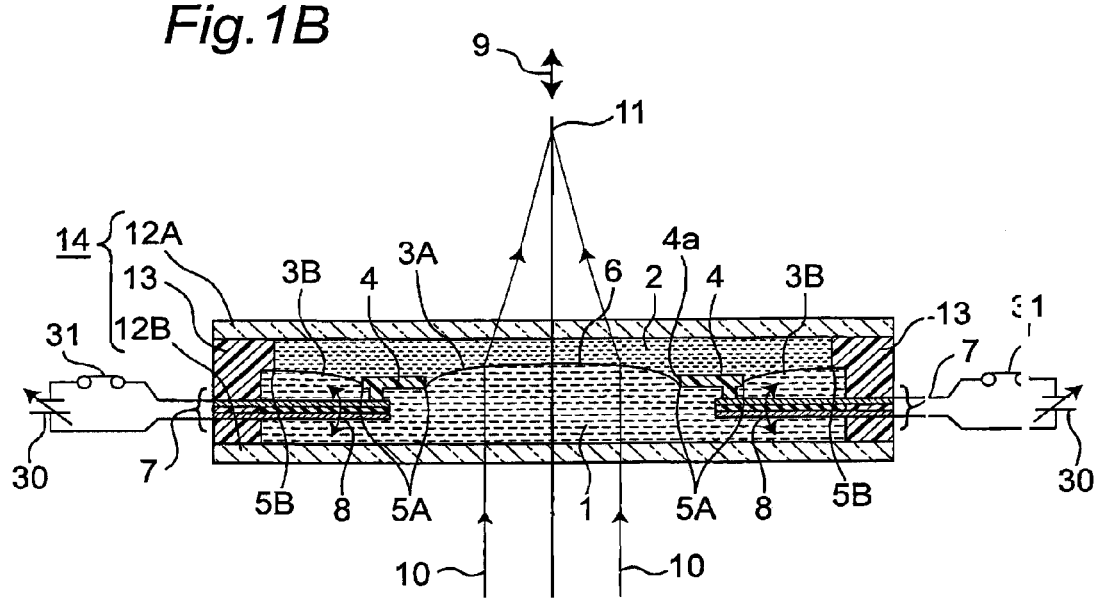
FIG. 1B is a cross-sectional view of the varifocal lens device in accordance with the first embodiment of the present invention.
Figure 1C:
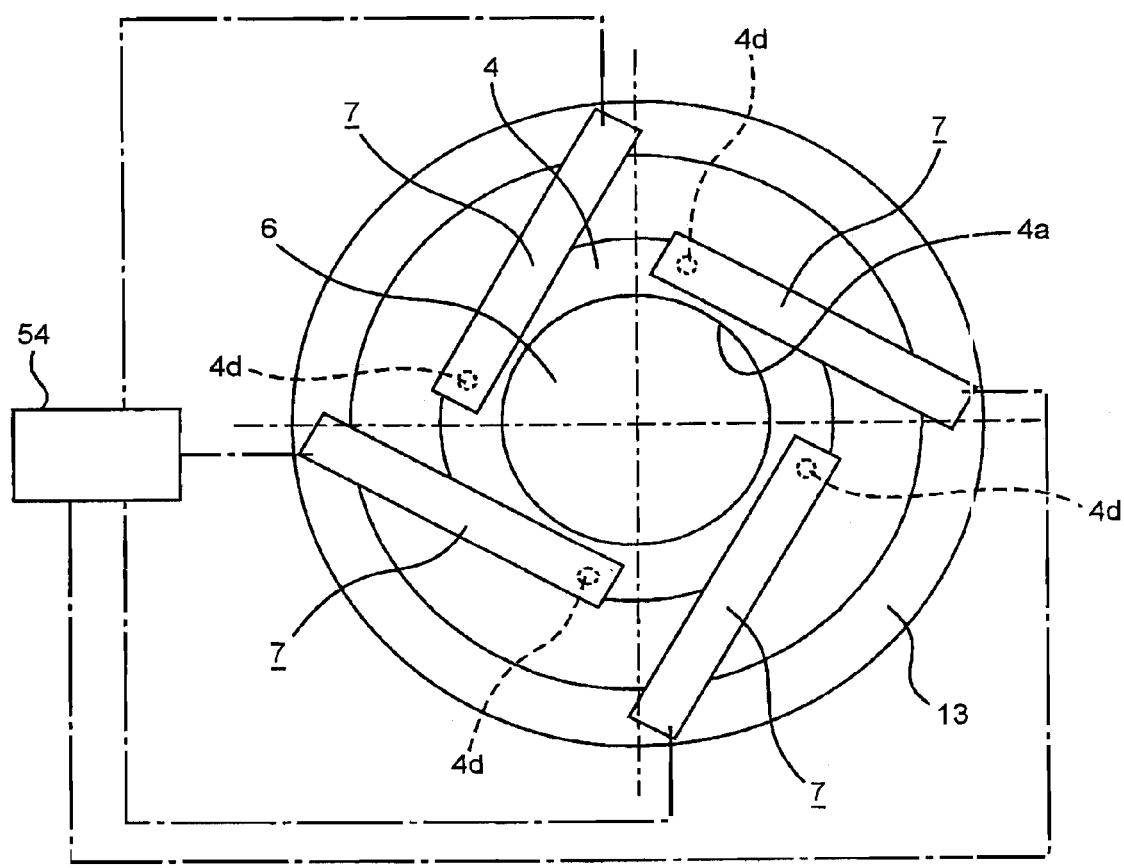
FIG. 1C is a plan view of the varifocal lens device in accordance with the first embodiment of the present invention.

FIGS. 1A and 1B are cross-sectional views of a varifocal lens device in accordance with the first embodiment of the present invention, and FIG. 1C is a plan view (plan view of the cross section of the actual or, obtained by viewing the cross-sectional view of FIGS. 1A and 1B from below) of the varifocal lens device of the first embodiment. The difference between FIG. 1A and FIG. 1B is that the curvatures of a liquid lens 6 are different from each other, and FIGS. 1A and 1B show that the different curvatures of the liquid lenses 6 form focal points 11 at respectively different positions on a light axis 9. In this case, the position of the focal point 11 of FIG. 1A is closer to the liquid lens 6 than the position of the focal point 11 of FIG. 1B.

The insulating first liquid 1 and the insulating second liquid 2 located on the first liquid 1 are allowed to form an interface 3 without being mixed with each other. In order to allow them to form the interface 3 without being mixed with each other, the densities of the first liquid 1 and the second liquid 2 are made approximately identical to each other. That is, in an attempt to present distortion in the liquid lens 6 due to influences from gravity and to make the liquid lens 6 more resistant against external disturbance due to an external force caused upon falling, colliding, or the like, it is preferable to make the densities of the first liquid 1 and the second liquid 2 approximately equal to each other.

An edge portion 5A of an insulating opening member 4 having a ring-shape is made in contact with the interface 3 between the first liquid 1 and the second liquid 2 to form interfaces (two-liquid interfaces) 3A and 3B of the two liquids 1 and 2. Here, the inside interface 3A of the two-liquid interfaces of the opening member 4 is a two-liquid interface that forms the liquid lens 6, and the outside interface 3B of the opening member 4 is a two-liquid interface that does not function as the liquid lens 6. The opening member 4 has a round opening portion 4a having a ring shape, and the two-liquid interface 3A of the round opening portion 4a forms the liquid lens 6 by the surface tension of the two-liquid interface 3A. The two-liquid interface is not allowed to advance and get a wetting beyond the edge portions 5A and 5B, and is remained stationary by these edge portions.

Here, the reason that another liquid interface 3B that does not function as the liquid lens 6 is formed together with the two-liquid interface 3A forming the liquid lens 6 is because, since both of the first liquid 1 and the second liquid 2 are sealed by a cell 14, the respective volumes are made constant, and because a change in the volume at the portion of the liquid lens 6 formed at the opening portion 4a of the opening member 4 can be absorbed by using this another liquid interface 3B. In the same manner as in the edge portion 5A of the opening member 4, to remain stationary this liquid interface by using an edge portion 5B formed on the sealing member 13 is preferably effective upon preparing a higher resistance from external disturbance due to an external force.

On a round convex portion 4d on the lower face of the opening member 4, respective ends of a plurality of actuators 7 are coupled to one another in a point-symmetrical manner around the light axis 9 (for example, in FIG. 1C, the respective ends of four actuators 7, disposed in tangent directions of the round opening member 4, with intervals of 90 degrees around the light axis 9, are coupled to the opening member 4, with the other ends being coupled to a sealing member 13 which will be described later), and all the actuators 7 is drive-controlled by a single actuator drive-controlling unit 54 in synchronism with one another. Therefore, under the drive-control of the actuator drive-controlling unit 54, synchronous bending operations of all the actuators 7 in bending directions 8 allow the opening member 4 to be advance/retreat driven so as to shift in parallel with the direction of the light axis 9. Light rays 10, made incident on the liquid lens 6 from the infinite distance, are condensed to a focal point 11, and the curvature of the liquid lens 6 changes depending on the position in the direction of the light axis 9 of the opening member 4 so that the position of the focal point 11 is shifted in a manner as shown in FIGS. 1A and 1B.

The first liquid 1, the second liquid 2, the movable opening member 4, and the actuator 7 are housed inside the insulating cell 14 formed by transparent plates 12A and 12B, each having an insulating property and a disc shape, and the insulating sealing member 13 that is placed in an annular shape on the peripheral portion of the transparent plates 12A and 12B so as to seal the first liquid 1 and the second liquid 2.

In this manner, the above-mentioned varifocal lens device has a structure in which the first liquid 1 and the second liquid 2 located on the first liquid 1 are housed in an inner space of the cell 14 formed by the disc-shaped transparent plates 12A and 12B and the sealing member 13 disposed in the annular shape on the peripheral portion of the transparent plates 12A and 12B, the opening member 4 is made in contact with the interface 3 between the first liquid 1 and the second liquid 2, and the opening member 4 is allowed to advance/retreat in directions along the light axis 6 as well as to shift in parallel therewith by the driving operations of the actuators 7 under control of the actuator drive-controlling unit 54, with the two-liquid interface 3A inside the round opening portion 4a of the opening member 4 being allowed to form the liquid lens 6.

In accordance with this arrangement, since the liquid interface 3 is made in contact with the interface 3 of the two liquids, and also remained stationary by the edge portion 5A of the opening member 4 capable of moving in the directions of the light axis 9, it is possible to stably maintain the shape of the liquid lens 6 from external disturbance due to an external force. Moreover, since the electro-wetting phenomenon requiring a nigh voltage upon driving is not utilized, the driving operation is carried out by using the actuator 7 of a low-voltage driving type, as will be described below.

Figure 1D:
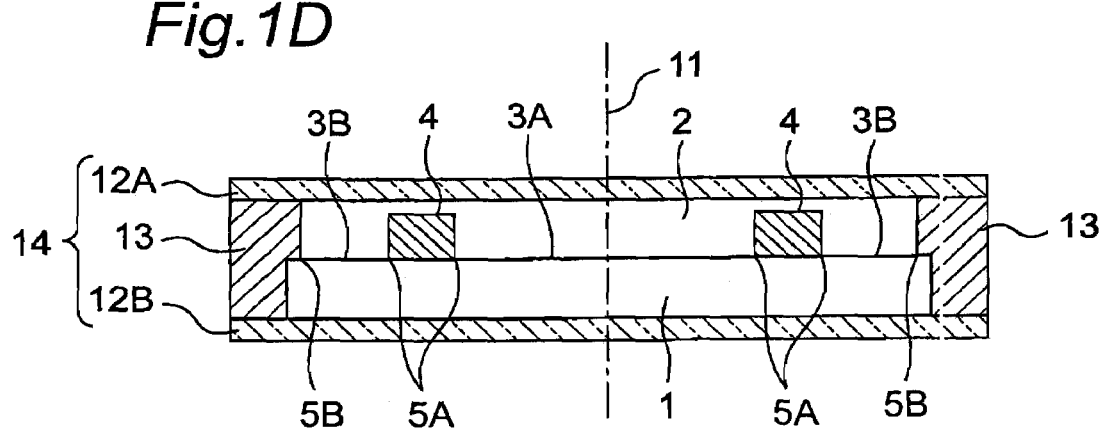
FIG. 1D, which is a principle explanatory view that explains a physical mechanism based on which a liquid lens of the varifocal lens device in accordance with the first embodiment of the present invention is formed, and shows a state prior to a pushing-in operation in which an opening member, located in a second liquid, pushes an interface between two liquids toward a first liquid.
Figure 1E:
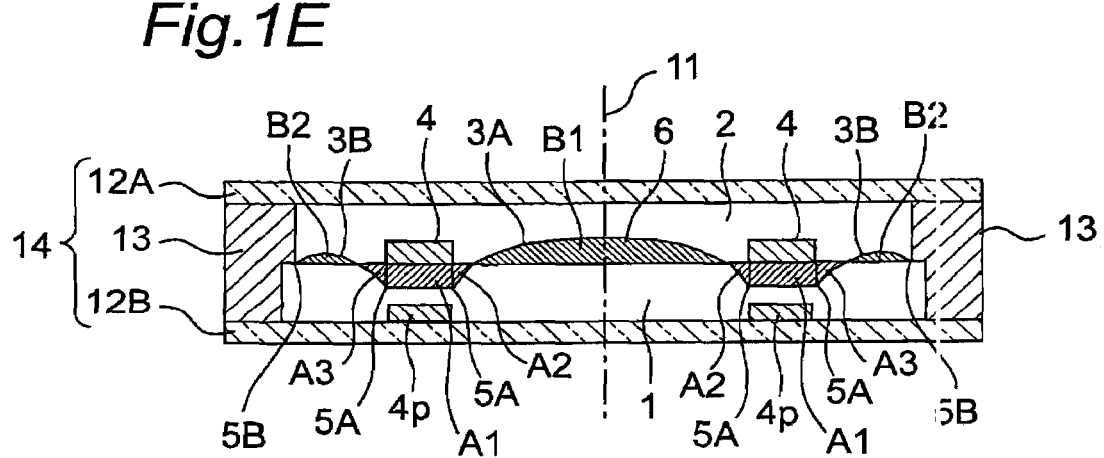
FIG. 1E, which is a principle explanatory view that explains the physical mechanism based on which the liquid lens of the varifocal lens device in accordance with the first embodiment of the present invention is formed, and shows a state after the pushing-in operation of the opening member into the first liquid side.

Referring to principle explanatory views (end-face views) shown in FIGS. 1D and 1E, a physical mechanism based on which the liquid lens 6 is formed is explained. The constituent elements of FIGS. 1D and 1E are similar to those shown in FIGS. 1A, 1B, and 1C; however, for convenience of explanation, those constituent elements relating to driving portions by the actuator 7 are omitted from FIGS. 1D and 1E. FIG. 1D shows a state prior to a pushing-in operation in which the opening member 4, located in the second liquid 2, pushes the interfaces 3A and 3B of the two liquids (two liquids 1 and 2) toward the first liquid 1. FIG. 1E shows a state after the opening meter 4 has been pushed into the first liquid 1 side. Supposing that, for convenience of explanation, the interfaces 32 and 3B of the two liquids in FIG. 1D form planes, the interfaces 3A and 3B of the two liquids in FIG. 1E are curved with a convex shape upward by the pushing-in of the opening member 4. At this time, the volumes of the first liquid 1 and the second liquid 2 are unchanged, with the first liquid 1 and the second liquid 2 being tightly-closed into the cell 14 and sealed therein; therefore, with respect to the volumes of volume portions A1, A2, A3, B1, and B2 indicated by hatched portions of FIG. 1E, the following relationship is satisfied.

$$A1+A2+A3=B1+B2$$

Here, the volume portion A1 represents a volume corresponding to a portion of the opening member 4 pushed into the first liquid 1. The volume portion A2 represents a volume corresponding to a portion of the second liquid 2 located near the inside of the opening portion 4a of the opening member 4 to be pushed into the first liquid 1 together with the opening member 4, when the opening member 4 is pushed into the first liquid 1. The volume portion A3 represents a volume corresponding to a portion of the second liquid 2 located near the outside of the opening portion 4a of the opening member 4 to be pushed, into the first liquid 1 together with the opening member 4, when the opening member 4 is pushed into the first liquid 1. The volume portion B1 represents a volume corresponding to a portion of the first liquid 1 located inside the opening portion 4a of the opening member 4 to be raised in a manner so as to be curved with a convex shape upward inside the opening portion 4a, when the opening member 4 is pushed into the first liquid 1. The volume portion B2 represents a volume corresponding to a portion of the first liquid 1 located outside the opening portion 4a of the opening member 4 to be raised in a manner so as to be curved with a convex shape upward outside the opening portion 4a, when the opening member 4 is pushed into the first liquid 1.

It has been known that by the surface tension on the interfaces 3A and 3B of the two liquids, the liquid interface 3A inside the opening portion 4a of the opening member 4 is formed into a spherical face under zero gravity, and in the liquid lens 6 relating to the first embodiment of the present invention also, the liquid lens 6 is formed into a virtually spherical face lens in the case where the edge portion 5 of the opening member 4 has a round shape. In particular, in the case of a more preferable embodiment formed by making the density of the two liquids and the density of the opening member 4 coincident with each other, the interface of the two liquids is formed into a state equivalent to zero gravity so that the interface between the two liquids can be made closer to a true spherical shape.

Figure 2:
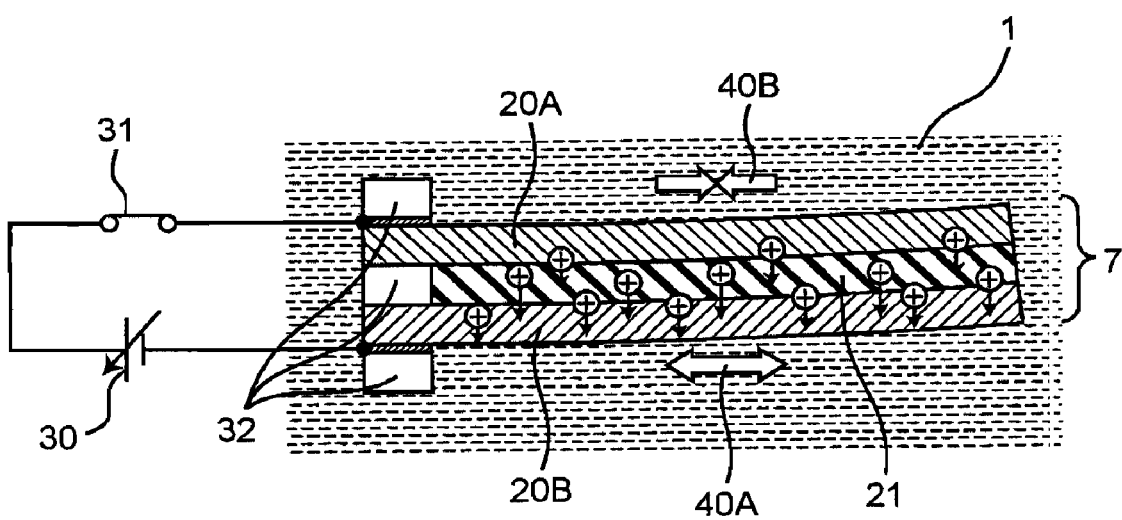
FIG. 2 is a cross-sectional view that shows an operational principle of an actuator for the varifocal lens device in accordance with the first embodiment of the present invention.

FIG. 2 is a cross-sectional view that shows an operation principle of the actuator 7 in accordance with the first embodiment. For example, the actuator 7 is prepared as a polymer actuator 7 of an electric stimulation type having a rectangular strip shape in which conductive polymer layers 20A and 20B sandwich a solid-state electrolysis 21, and this is secured by insulating securing members 32 that forms a securing end of the actuator 7. Here, in FIGS. 1A, 1B, and 1C, the sealing member 13 also has a function as the securing members 32. Power supplies 30 and switches 31, which are respectively operation-controlled by the actuator drive-controlling unit 54, are connected to the conductive polymer layers 20A and 20B, and by applying a voltage from the power supply 30 to the conductive polymer layers 20A and 20B, ions of the solid-state electrolysis 21 are allowed to go into and come out of the conductive polymer 20A and the conductive polymer 20B so that a bending operation is carried out. Here, in FIG. 1A, at a first glance, it looks like there are two actuator drive-controlling units 54; however, those are illustrated for easiness of understanding, and actually, as shown in FIG. 1C, a single actuator drive-controlling unit 54 is preferably used for controlling all the rower supplies 30 and the switches 31. In the other views, such as FIG. 1B, for convenience of explanation, with respect to the actuator drive-controlling unit 54, the power supplies 30, and the switches 31, one portion or all the portions thereof are arbitrarily omitted from the views.

Ions are allowed to move in a direction corresponding to the polarity of an applied voltage, and in the case of FIG. 2, cations (positive ions) are allowed to go out from the conductive polymer layer 20A toward the solid-state electrolysis 21 so that the conductive polymer layer 20A is allowed to shrink; in contrast, cations are allowed to enter the conductive polymer layer 20B from the solid-state electrolysis 21 so that the bulk of the ions increases to cause the conductive polymer layer 201 to extend, with the result that the actuator 7 is driven to be bent into a convex shape downward. In such a case reversed to that of FIG. 2, cations (positive ions) are allowed to go out from the conductive polymer layer 20B toward the solid-state electrolysis 21 so that the conductive polymer layer 20B is allowed to shrink; in contrast, cations are allowed to enter the conductive polymer layer 20A from the solid-state electrolysis 21 so that the bulk of the ions increases to cause the conductive polymer layer 20B to extend, with the result that the actuator 7 is driven to be bent into a convex shape upward. In the above explanation, the principle of the bending operations of the actuator 7 is discussed based upon incoming and outgoing cations; however, the bending operations may be carried out in the same manner even based upon incoming and outgoing anions (negative ions) or based upon incoming and outgoing ions of the above two kinds.

Since these actuators 7 of the bending type have a thin plate shape made of a flat plate, they are suitably used for forming a thin varifocal lens device. Here, for example, the thicknesses of the conductive polymer layers 20A and 20B forming the actuator 7 may be set to about 10 μm to 25 μm respectively, the thickness of the solid-state electrolysis 21 may be set to about 10 μm to 100 μm, and the entire thickness of the actuator 7 may be set to about 30 μm to 150 μm. Moreover, for example, since the thickness of the opening member 4 may be set to about 1 mm, the thickness of the actuator 7 causes no restriction in an attempt to make the thickness of the cell 14 thinness so that it becomes possible to provide a thin varifocal lens device having a cell thickness of several millimeters.

The actuator 7 of the electric stimulation type is disposed so as to be included in the first liquid 1, and by preparing the first liquid 1 as a non-water-soluble liquid, the polymer actuator can be operated under the environment from which moisture is shielded so that it is possible to prevent deterioration due to the presence of moisture, and consequently to provide an actuator that is superior in cycle life and reliability.

With respect to the conductive polymer forming the conductive polymer layers 20A and 20B forming the actuator 7, polymers that exert electron conductivity in themselves, for example, organic conductive polymers, such as polyaniline, polypyrrole, or polythiophene, or conductive polymers in which carbon-based fine particles are dispersed, may be used under the above-mentioned operation principle.

The following description will discuss some working examples in accordance with the first embodiment.

Working Example 1

A film, prepared by a process in which polypyrrole was synthesized by allowing an electrolytic polymerization in an organic solvent in which a ionomer of pyrrole was dissolved in propylene carbonate forming a supporting electrolytic layer, by using a carbon electrode as a deposition electrode in a galvano-stat mode (constant current controlling mode), was used as a conductive polymer, and a film, prepared by gelling ethylmethyl imidazolium-trifluoromethane sulfonyl imide (EMI-TFSI) serving as an ionic liquid, was used as the solid-state electrolysis so that the actuator having the structure as shown in FIG. 2 was obtained.

Methyl-phenyl-based silicone oil was used as the first liquid. This oil was non-water-soluble oil. A sodium chloride aqueous solution was used as the second liquid that is water-soluble. As shown in FIG. 2, the above-mentioned actuator was disposed in the silicone oil serving as the first non-water-soluble liquid. The actuator having this structure can be driven under a low driving voltage of ±1V to 2V.

This polymer actuator is driven to be bent mainly by incoming and outgoing EMI cations to and from the polypyrrole film. Since expansion and contraction of the polymer due to the incoming and outgoing EMI cations that are organic cations having a comparatively large ionic radius can be utilized, it is possible to achieve an actuator having a large positional change upon actuation.

Here, in the varifocal lens device in accordance with the first embodiment of the present invention, in an attempt to prevent strain in the lens due to influences from gravity and to make the lens more resistant against external disturbances due to an external force caused upon falling, colliding, or the like, it is preferable to make the densities of the first liquid and the second liquid virtually identical to each other.

When the density of the silicone oil used in the working example 1 was measured by a vibration-type densitometer, a density of 1.07 $g/cm^2$ was obtained. The sodium chloride aqueous solution was used as the second water-soluble liquid. The aqueous solution having a density of 1.07 $g/cm^2$ was obtained through precise adjustments, by adjusting the mixing ratio of sodium chloride and water by using the vibration-type densitometer. Both of these were transparent liquids, and these were not mixed with each other so that a liquid lens was formed. When the refractive index thereof was measured by using an Abbe refractometer, the refractive index of the silicone oil was 1.51, and the refractive index of the sodium chloride aqueous solution was 1.35; thus, it is found chat liquid lenses having different refractive indexes can be formed. In an attempt to obtain a large focal-position change relative to a small curvature change, the greater the difference in refractive indexes, the more desirable. In order to obtain combinations of materials having identical densities and different refractive indexes, in addition to the silicone oil based materials, various organic substances and their mixture may be us ad as the first non-water-soluble liquid. Moreover, in order to provide higher resistance to external disturbance due to an external force, the first non-water-soluble liquid may have a thickener added thereto so as to restrain its fluidity or may be prepared as a gelled fluidizing material having a polymer crosslinking structure.

In the present working example, the sodium chloride aqueous solution is used as the second water soluble liquid; however, an antifreezing liquid, such as an ethylene glycol aqueous solution, is more preferably used so as to be used at low temperatures.

Working Example 2

In the same manner as in working example 1, a film, prepared by a process in which polypyrrole was synthesized by allowing an electrolytic polymerization in an organic solvent in which a monomer of pyrrole was dissolved in propylene carbonate forming a supporting electrolytic layer, by using a carbon electrode as a deposition electrode in a galvano-stat mode (constant current controlling mode), was used as a conductive polymer, and a film, prepared by gelling ethylmethyl imidazolium-trifluoromethane sulfonyl imide (EMI-TFSI) serving a; an ionic liquid, was used as the solid-state electrolysis so that the actuator having the structure as shown in FIG. 2 was obtained.

Ethylmethyl imidazolium-trifluoromethane sulfonyl imide (EMI-TFSI) serving as an ionic liquid, used as the electrolytic material for the solid-state electrolysis gel, was used as the first liquid. This electrolytic solution was a normal-temperature melting salt that forms an ionic bonding liquid at normal temperature, made from EMI organic cations and TFSI anions, and had a non-water-soluble property.

The actuator having this structure can be driven under a low driving voltage of ±1V to 2V, and since an ions and cations, required for driving, are supplied from the ionic liquid serving as the first liquid, the ionic liquid is also allowed to serve as the electrolytic layer required for the actuator so that a convenient structure is provided.

This polymer actuator is driven to be bent mainly by incoming and outgoing EMI cations to and from the polypyrrole film. Since expansion and contraction of the polymer due to the incoming and outgoing EMI cations that are organic cations having a comparatively large ionic radius can be utilized, it is possible to achieve an actuator having a large positional change upon actuation.

When the density of the ethylmethyl imidazolium-trifluoromethane sulfonyl imide (EMI-TFSI) serving as an ionic liquid was measured by a vibration-type densitometer, a density of 1.52 g/cm$^2$ was obtained. A sodium polytungstate aqueous solution was used as the second water-soluble liquid. Since sodium polytungstate was a water soluble substance having a specific gravity higher than water, it was possible to obtain an aqueous solution having a wide range of density. An aqueous solution having 40% to 42% of sodium polytungstate at a mass ratio was prepared, and the aqueous solution having a density of 1.52 g/cm$^2$ was obtained through precise adjustments, by adjusting the mixing ratio thereof to water by using the vibration-type densitometer. Both of these were transparent liquids, and these were not mixed with each other so that a liquid lens was formed.

When the refractive index thereof was measured by using an Abbe refractometer, the refractive index of ethylmethyl imidazolium-trifluoromethane sulfonyl imide (EMI-TFSI) was 1.43, and the refractive index of the sodium polytungstate aqueous solution was 1.40; thus, it is found that liquid lenses having different refractive indexes can be formed.

Next, as materials for each of the ring-shaped opening members, three kinds of complex materials were used, that is, glass-fiber containing polyamide (density: 1.65 g/cm$^2$) serving as a complex material made from a plurality of members having different densities, glass-fiber containing polyphenylene sulfide (density: 1.66 q, cm$^2$) serving as a complex material made from a plurality of members having different densities, polyether ether ketone (density: 1.30 g/cm$^2$), and PTFE (density: 2.14 g/cm$^2$) used to prepare ring-shaped opening members, and vibration tests were carried out with the gravitational acceleration 1G with the ring-shaped opening members being mad in contact with the two-liquid interface; as a result, in the case of the ring-shaped opening member made from the glass fiber containing polyamide as well as in the case of the ring-shaped opening member made from the glass fiber containing polyphenylene sulfide, disturbances on the liquid lens interface were hardly observed; however, in the case of the ring-shaped opening member made from the PTFE, disturbances on the liquid lens interface were clearly observed. Consequently, it has been found that in an attempt to make the varifocal lens device in accordance with the first embodiment of the present invention more resistant against external disturbances due to an external force caused upon falling, colliding, or the like, it is preferable to make the density of the opening member 4 virtually the same as those densities of the first liquid 1 and the second liquid 2 (more specifically, for example, with a difference within ±0.3 g/cm$^2$).

Here, the glass-fiber containing plastic material used in the experiments had a content ratio of glass fibers of 50%, and by adjusting this content ratio, the density of the opening member 4 can be made precisely coincident with the density of the first liquid 1 and the second liquid 2.

Any of the ring-shaped opening members used in the experiments tended to be less wettable to the ionic liquid; however, by subjecting the opening member 4 to a surface treatment for applying water repellency or hydrophilicity thereto, the two-liquid interface 3 remained stationary by the edge portion 5A of the opening member 4 was more stably remained stationary, and the material for the opening member 4 could be selected from a wider range. In particular, by adjusting the wettability of the contact portion between the first liquid 1 and the second liquid 2 of the opening member 4 through a surface treatment, the edge portion 5A can be more firmly remained stationary.

Working Example 3

The following description will discuss the results of experiments carried out on the shape of the edge portion of the ring-shaped opening member.

Figure 8A:
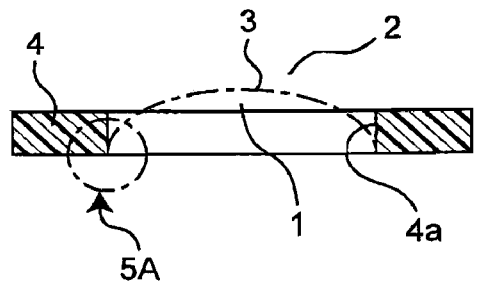
FIG. 8A is a cross-sectional view of an opening member of the varifocal lens device in accordance with the first embodiment of the present invention.
Figure 8B:
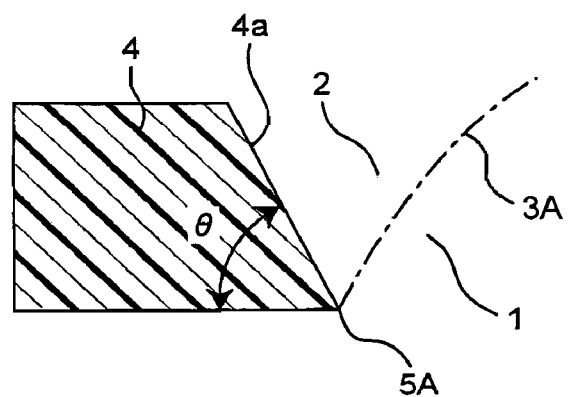
FIG. 8B is an enlarged cross-sectional view of an edge portion of one example of the opening member of the varifocal lens device in accordance with the first embodiment of the present invention.
Figure 8C:
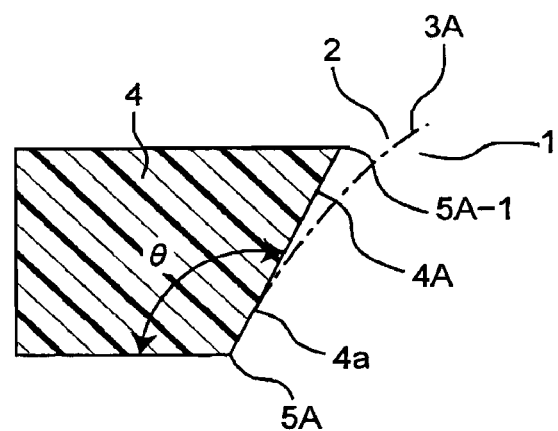
FIG. 8C is an enlarged cross-sectional view of an edge portion of another example of the opening member of the varifocal lens device in accordance with the first embodiment of the present invention.

In the cross-sectional view of the ring-shaped opening member 4 shown in FIG. 8A, FIGS. 8B and 8C show the enlarged cross-sectional view of the edge portion 5A. FIG. 8B indicates a structure in which the angle θ of the edge portion 5A is prepared as an acute angle, and FIG. 8C indicates a structure in which the angle θ of the edge portion 5A is prepared as an obtuse angle. By using ring-shaped opening members 4 made from the glass fiber containing polyphenylene sulfide and each having an inner diameter of 4.5 mm and an outer diameter of 9 mm with a thickness of 0.8 mm, ring-shaped opening members 4 having various angles in the edge portion 5A of the inner diameter were prepared. By using ethylmethyl imidazolium-trifluoromethane sulfonyl imide (EMI-TFSI) as the first liquid 1, as well as by using pure water with the density of which had not been adjusted for convenience of experiments as the second liquid 2, the ring-shaped opening members 4 were pushed into the two-liquid interface from the second liquid 2 so that the state in which the two-liquid interface was remained stationary by each of the edge portions 5A was observed.

The following Table 1, which summarizes the results of the experiments, indicates that in any of the cases of acute angles of θ (30°, 45°, 70°) as well as the right angles of θ (90°) in the edge portion 5A as shown in FIG. 8B, the remaining-stationary states of the two-liquid interface 3 by the edge portions 5A were good. However, in the case of an obtuse angle of θ in the edge portion 5A as shown in FIG. 8C, at 110°, when the liquid face curvature becomes smaller as the pushed-in ring-shaped opening member 4 advances, a phenomenon in which the two-liquid interface 3 advances and gets a wetting toward the side face 4A side on the inner side of the ring-shaped opening member 4 was observed. Moreover, in the cases of 135° and 150° of the angles θ in the edge portions 5A, the fact that the two-liquid interface 3 was remained stationary not to the edge portion 5A, but to an edge portion 5A-1 on the opposite side of the edge portion 5A was observed. From the above-mentioned observation results, it is found that the angle θ in the edge portion 5A is preferably set to an acute angle or right angles and that an obtuse angle is not preferable, although it is still in an applicable range.

With respect to the inner diameter of the opening portion 4a of the ring-shaped opening member 4, those having the inner diameter in a range of from the microlens area of less than 1 mm to about several tens of mm may be used; however, from the viewpoint of providing a firm resistance against disturbance due to an external force, those having a small diameter are preferably used. With respect to the thickness of the ring-shaped opening member 4, in the same manner, from the viewpoint of providing a firm resistance against disturbance due to an external force, a thin structure, for example, in a range of about 0.2 mm to 0.5 mm, with a small mass of its own, may be preferably used as long as it is within a range capable of maintaining its shape in view of its strength.

Figure 10:
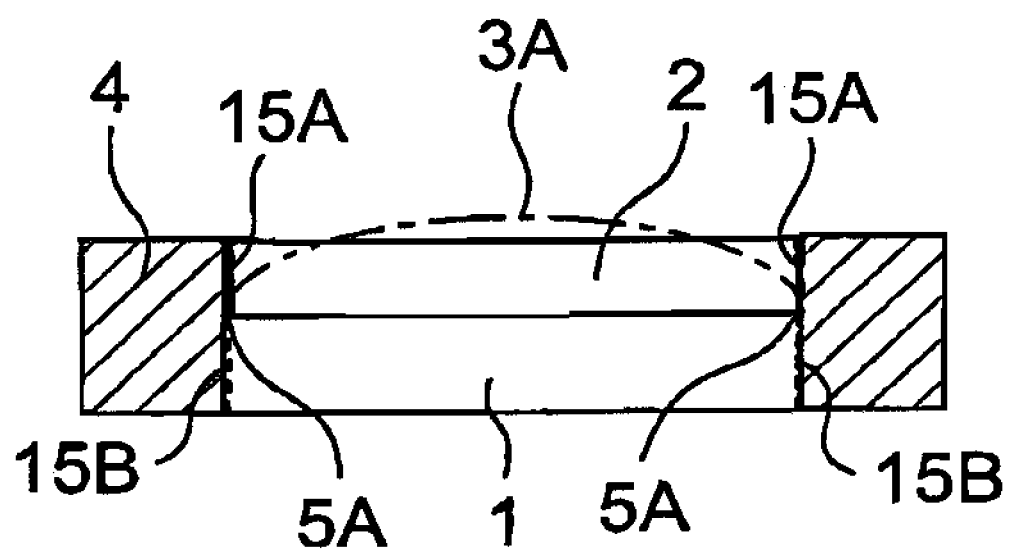
FIG. 10 is a cross-sectional view that shows another example corresponding to an edge portion of the opening member of the varifocal lens device in accordance with the first embodiment of the present invention.

Not limited to either upper or lower end edge of the opening portion 4a of the opening member 4, the edge portion 5A of the opening member 4 may be formed on the intermediate portion of the inner wall face of the opening portion 4a of the opening member 4. For example, FIG. 10 is a cross-sectional view showing another example of the structure of the edge portion 5A of the opening member 4. This example corresponds to a structure in which a surface-treated film 15a that is hydrophilic to the second liquid 2 is formed on the inner wall face of the opening portion 4a of the opening member 4 on the second liquid side for example, on the upper half side

TABLE 1

| θ | 30° | 45° | 70° | 90° | 110° | 135° | 150° |
|---|---|---|---|---|---|---|---|
| Remaining-stationary property of two-liquid interface at edge portion | ○ | ○ | ○ | ○ | Δ | × | × |
| Note | OK | OK | OK | OK | As the liquid face curvature becomes smaller, the two-liquid interface advances to get a wetting toward the side face 4A. | The two-liquid interface was remained stationary to another edge portion 5A'. | Same |

Figure 9A:
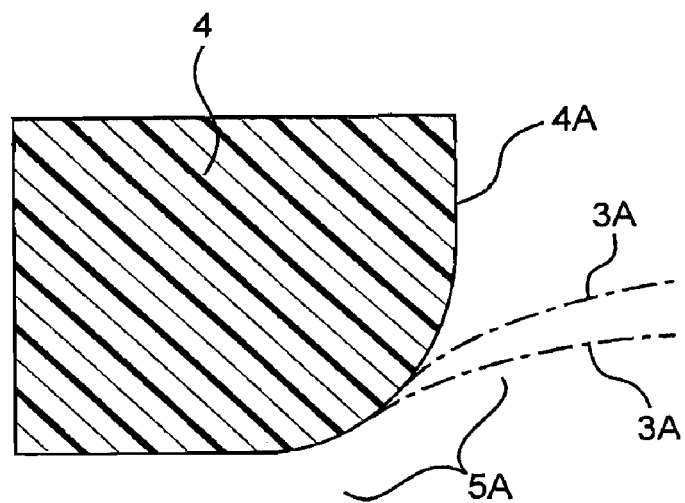
FIG. 9A is an enlarged cross-sectional view of an edge portion having a certain curvature radius of the opening member of the varifocal lens device in accordance with the first embodiment of the present invention.
Figure 9B:
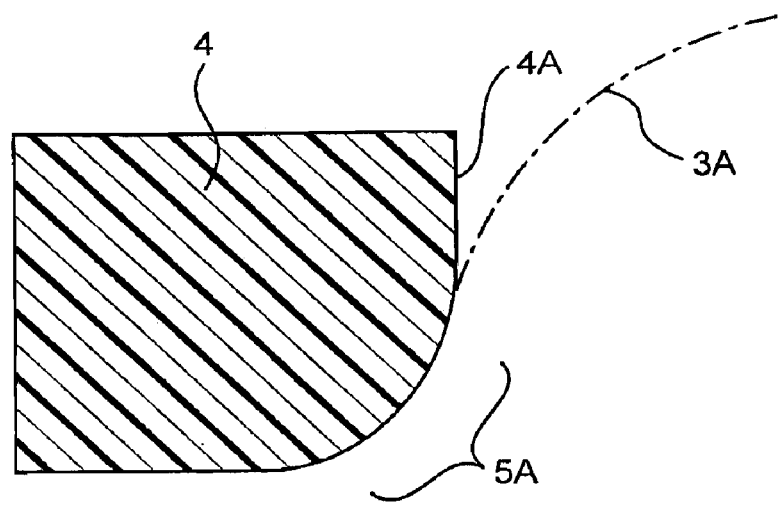
FIG. 9B is an enlarged cross-sectional view of an edge portion having another curvature radius of the opening member of the varifocal lens device in accordance with the first embodiment of the present invention.

The curvature of each of the edge portions 5A of the ring-shaped opening members 4 used in the above-mentioned experiments was set to R0.1 mm or less, and the member having a curvature radius of 0.5 mm was prepared, and the remaining-stationary state of the edge portion 5A was observed. Each of FIGS. 9A and 9B is a cross-sectional view showing the edge portion 5A. FIG. 9A shows the state of the two-liquid interface 3A in a step where the ring-shaped member 4 is started to be pushed into the two-liquid interface 3A. It was observed that the two-liquid interface 3A advanced and got a wetting into the chamfered portion 5A with a curvature radius of 0.5 mm corresponding to the edge portion 5A. FIG. 9B shows the state in which the ring-shaped opening member 4 was further pushed the rein, and it was observed that, after the two-liquid interface 3A had advanced and got a wetting to the border of the chamfered portion 5A and the side face 4A, forming the edge portion 5A, the two-liquid interface 3A was remained stationary to this portion. From these observations, it is confirmed that, although the application of a curvature to the edge portion 5A may be carried out, it is preferable to provide a sharp edge portion 5A from the viewpoint of firmly carrying out the remaining-stationary operation.

in FIG. 10), while a surface-treated film 15B that is water-repellent to the second liquid 2 is formed on the inner wall face of the opening portion 4a of the opening member 4 on the first liquid side (for example, on the lower half side in FIG. 10), with an edge portion 5A being formed as the border between the surface-treated film 15A and the surface-treated film 15B. More specifically, in the case where the second liquid 2 is an aqueous solution, a silane-coupling agent film is formed as the hydrophilicity-treated film and a Tefron (registered trademark)-based film is formed as the water-repellency-treated film so that the edge portion 5A of this type can be formed. The edge portion 5A of this type may be formed not only on the center portion of the inner wall face of the opening portion 4a of the opening member 4, but also on an area prepared by properly adjusting the surface-treated film 15A and the surface-treated film 15B; thus, the edge portion 5A may be formed on a desired position on the inner wall face.

The above description has discussed the method by which the two-liquid interface 3A is remained stationary by the edge portion 5A of the opening member 4, and in order to more positively prevent the two-liquid interface 3A from advancing to get a wetting beyond the edge portion 5A with the result that the two-liquid interface 3A is damaged, the angle change at the edge portion 5A of the two-liquid interface 3A is preferably limited by regulating the movable range of the opening member 4. With respect to the specific example to limit the movable range of the opening member 4, as shown in FIG. 1E, a protrusion 4p serving is a stopper may be placed on the inner face of the transparent plate 12B to allow the opening member 4 to come into contact with the protrusion 4p so that the lower limit position of the opening member 4 can be regulated.

Second Embodiment

The following description will discuss a varifocal lens device in accordance with the second embodiment of the present invention.

Figure 3:
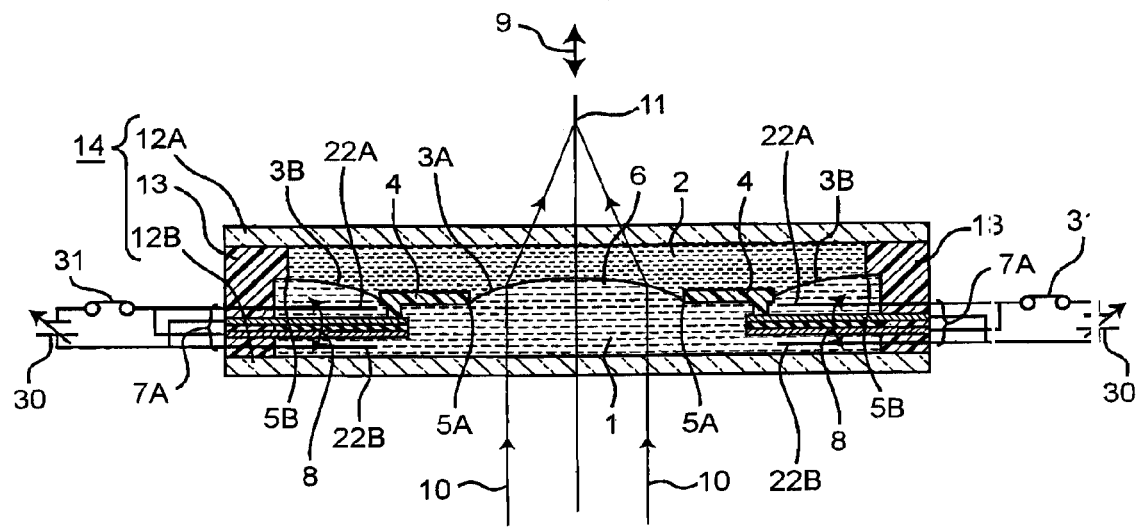
FIG. 3 is a cross-sectional view of a varifocal lens device in accordance with a second embodiment of the present invention.
Figure 4:
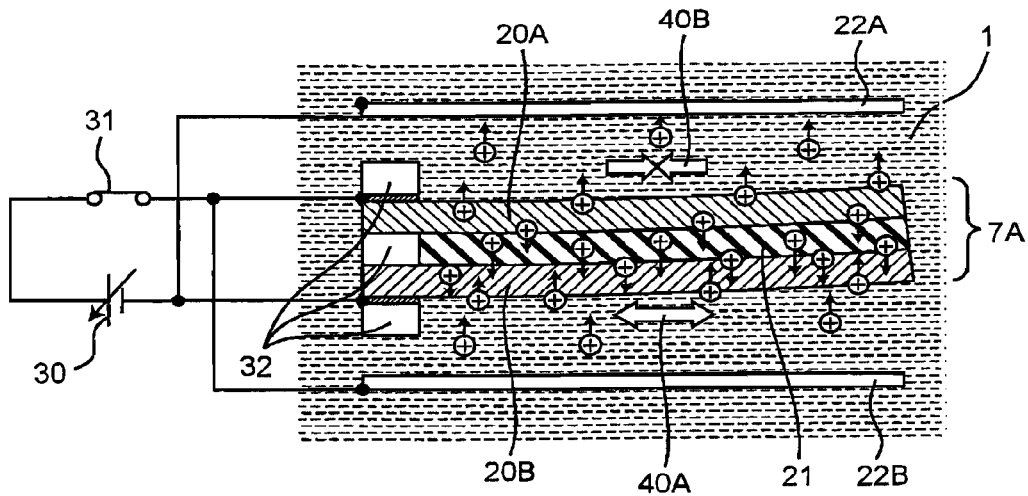
FIG. 4 is a cross-sectional view that show; an operational principle of an actuator for the varifocal lens device in accordance with the second embodiment of the present invention.

FIG. 3 is a cross-sectional view that shows the varifocal lens device in accordance with the second embodiment of the present invention. Since the layout of an actuator 7A is similar to that of the actuator 7 on the plan view of FIG. 1B, the plan view thereof is omitted. FIG. 4 is a cross-sectional view that shows an operational principle of the actuator 7A for the varifocal lens device in accordance with the second embodiment of the present invention. In the second embodiment, by utilizing the feature that the actuator 7A of an electric stimulation type is included in an electrolytic solution serving as the first liquid 1, other electrodes (opposing electrodes 22A and 22B) are separately formed in the first liquid 1 so that the driving performance of the actuator 7A is improved. In the same manner as in the actuator 7 of the first embodiment, the actuator 7A is also drive-controlled under controlling operations of the actuator drive-controlling unit 54.

In the same manner as in the first embodiment, a film, prepared by a process in which polypyrrole is synthesized by allowing an electrolytic polymerisation in an organic solvent in which a monomer of pyrrole was dissolved in propylene carbonate forming a supporting electrolytic layer, by using a carbon electrode as a deposition electrode in a galvano-stat mode (constant current controlling mode), was used as a conductive polymer forming the polymer layers 20A and 20B, and a film, prepared by gelling ethylmethyl imidazolium-trifluoromethane sulfonyl imide (EMI-TFSI) serving as an ionic liquid, was used as the solid-state electrolysis so that an actuator 7A having the same structure as that shown in FIG. 4 was obtained. As the first liquid 1, ethylmethyl imidazolium-trifluoromethane sulfonyl imide (EMI-TFSI) serving as an ionic liquid, used as the electrolysis material for this solid-state electrolytic gel, was used.

In the actuator 7A having this structure, by applying a voltage with a polarity as shown in FIG. 4 to the opposing electrodes 22A and 22B from the power supply 30 (in other words, between the conductive polymer layers 20A, 20B and the opposing electrode 22A as well as the opposing electrode 22B, in a manner so as to make the polarities of the electrodes mutually opposing through the first liquid 1 different from each other), incoming and outgoing ions are obtained from both of the surfaces of the conductive polymer layers 20A and 20B capable expanding and contracting (that is, from both of interfaces on the solid-state electrolysis 21 side and the electrolytic solution side serving as the first liquid 1) so that a large positional change is obtained upon driving, and incoming and outgoing ions are quickly obtained; thus, the actuator 7A is allowed to execute high-speed driving operations. Here, in FIG. 4, for example, cations (positive ions) are allowed to go out from the conductive polymer layer 20A toward the first liquid 1 between the conductive polymer layer 20A and the opposing electrode 22A as well as toward the solid-state electrolysis 21 so that the conductive polymer layer 20A is allowed to shrink as indicated by arrow 40B; in contrast, cations are allowed to enter the conductive polymer layer 20B respectively from the solid-state electrolysis 21 as well as from the first liquid 1 between the conductive polymer layer 20B and the opposing electrode 22B so that the bulk of the ions increases to cause the conductive polymer layer 20B to extend as indicated by arrow 40A, with the result that the actuator 7 is driven to be bent into a convex shape downward. Upon applying a voltage reversely, the reversed operations are respectively carried out.

In the present invention, in addition to the two-liquid materials described in the above-mentioned working example 1 and working example 2, combinations between two different liquids having different refractive indexes, which are not mixed with each other, such as combinations between various oils and organic solvents, for example, silicone oil and alcohols, or combinations between various ionic liquids and organic solvents, may be used.

Third Embodiment

The following description will discuss a varifocal lens device in accordance with the third embodiment of the present invention.

Figure 5:
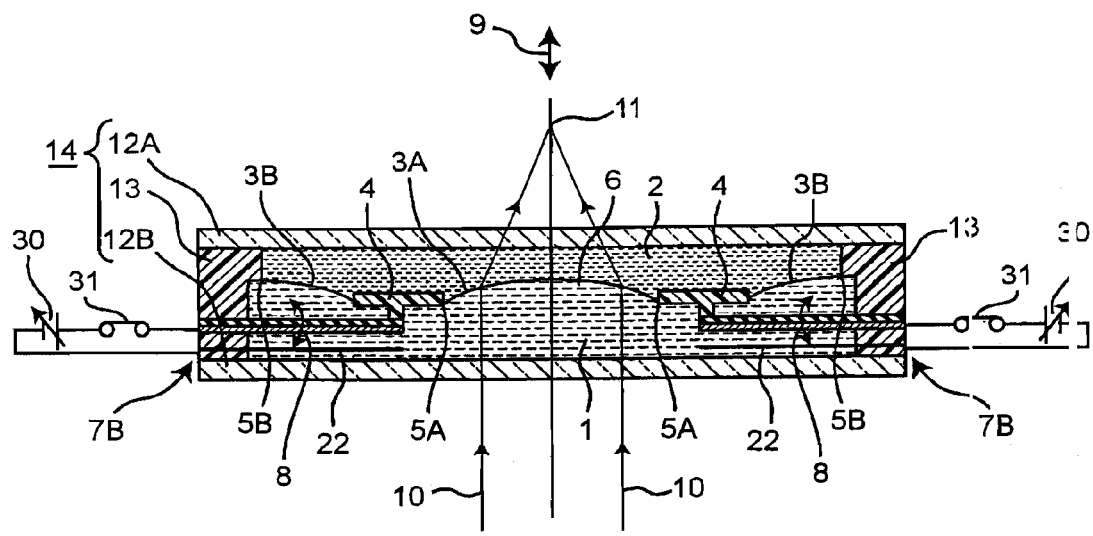
FIG. 5 is a cross-sectional view of a varifocal lens device in accordance with a third embodiment of the present invention.
Figure 6:
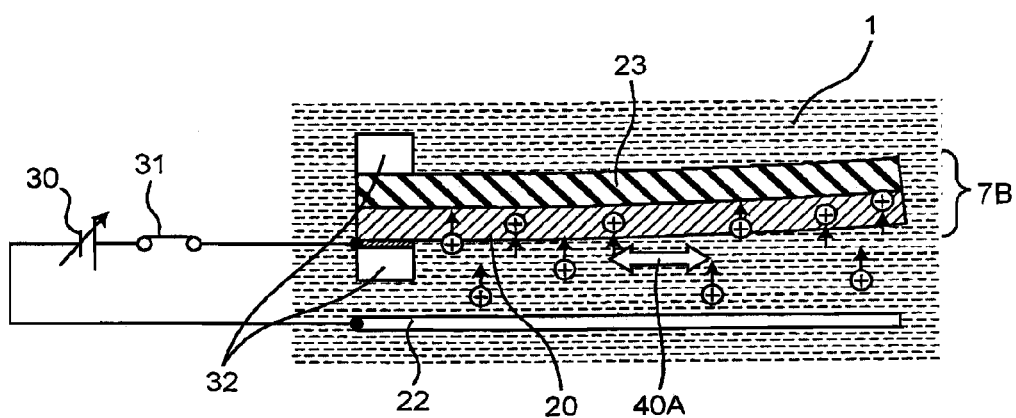
FIG. 6 is a cross-sectional view that show; an operational principle of an actuator for the varifocal lens device in accordance with the third embodiment of the present invention.

FIG. 5 is a cross-sectional view that shows the varifocal lens device in accordance with the third embodiment of the present invention. Since the layout of an actuator 7B is similar to that of the actuator 7 on the plan view of FIG. 1B, the plan view thereof is omitted. FIG. 6 is a cross-sectional view that shows an operational principle of the actuator 7B for the varifocal lens device in accordance with the third embodiment of the present invention. Different from the aforementioned first and second embodiments, the third embodiment relates to the actuator 7B of a type using no solid-type electrolysis 21, and by utilizing the feature that the actuator 7B of an electric stimulation type is included in an electrolytic solution serving as the first liquid 1, another electrode 22 is separately formed in the first liquid 1 so that the structure of the actuator 7A is simplified, and can be consequently manufactured more easily. In the sane manner as in the actuator 7 of the first embodiment, the actuator 7B is also drive-controlled under controlling operations of the actuator drive-controlling unit 54.

As shown in FIG. 6, in the actuator 7A having this structure, by applying a voltage between the conductive polymer layer 20 and the opposing electrode 22 from the power supply 30, bending operations are obtained. The conductive polymer layer 20 to be expanded and contracted has such a structure that the layer 20 is bonded to a non-extendable member 23, and since the conductive polymer layer 20 is expanded and contracted by the incoming and outgoing ions, while the non-extendable member 22 is not expanded and contracted, the actuator 7A having the bonded structure between the conductive polymer layer 20 and the non-extendable member 23 is driven to be tent.

The actuator 7A of this structure can be manufactured by using the following simple processes. Since an electrode is required for use in deposition so as to form polypyrrole through an electrolytic polymerization method, a gold thin film is first vapor-deposited on the surface of a polyimide film serving as the non-extendable member 23, and on this electrode (not shown), a polypyrrole film functioning as an extendable and contractable member is directly formed through electrolytic polymerization; thus, such a bonded structure of the actuator 7A is obtained. Here, the opposing electrode 22 may be prepared as a transparent electrode formed on the cell inner fact of the transparent plate 12B.

A polypyrrole film is used as the conductive polymer material, and ethylmethyl imidazolium-trifluoromethane sulfonyl imide (EMI-TFSI) serving as an ionic liquid is used as the first liquid.

Fourth Embodiment

Figure 11:
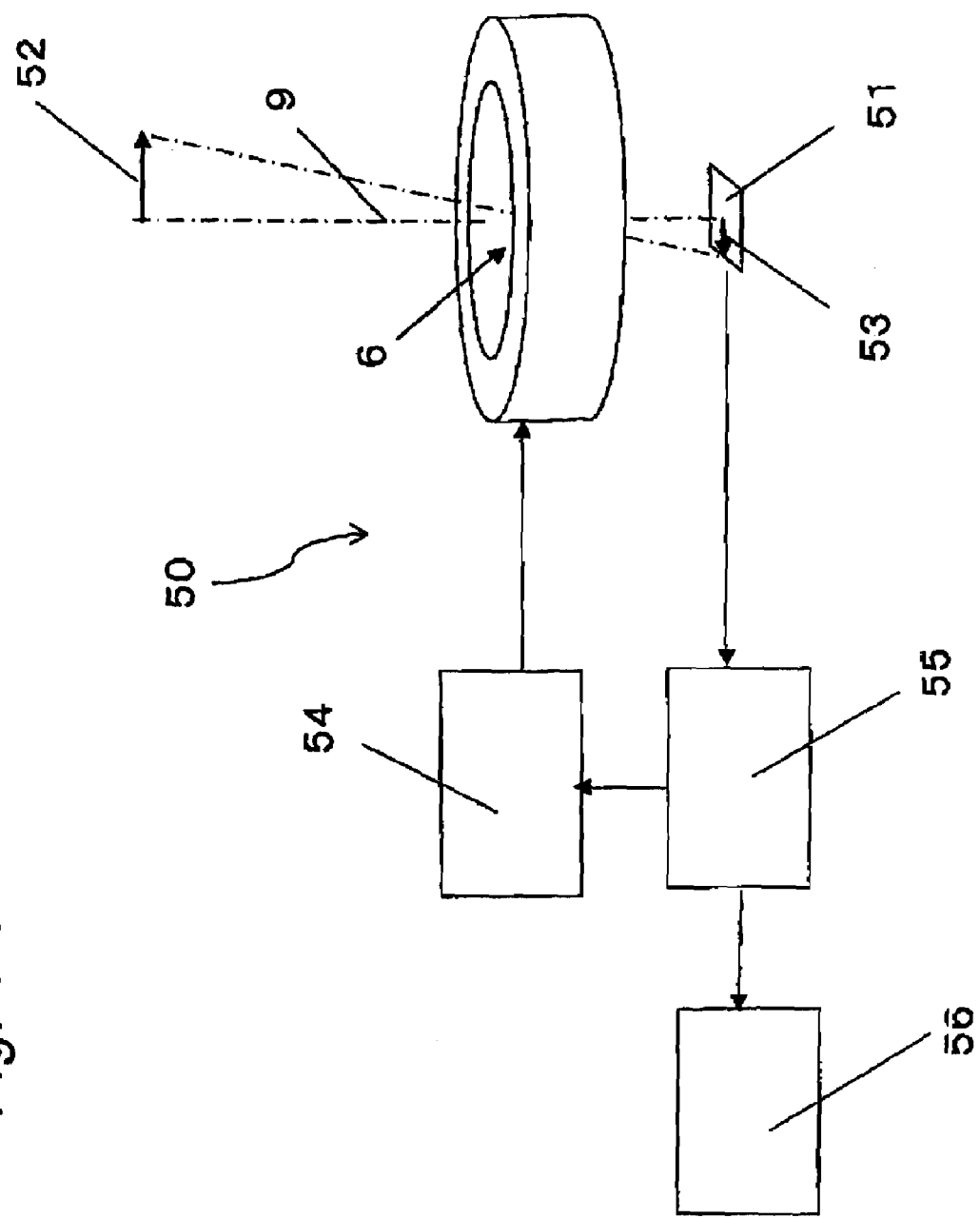
FIG. 11 is a block diagram that shows an image-pickup apparatus to which any one of the varifocal lens device of the first to third embodiments is applied in accordance with a fourth embodiment of the present invention.

Next, the fourth embodiment of the pre sent invention relates to an example in which the varifocal lens device in accordance with the first to third embodiments is applied to an image pickup apparatus. FIG. 11 shows one example of a block diagram of the image pickup apparatus.

The image pickup apparatus is constituted by the varifocal lens device 50 including the actuator drive-controlling unit 54, an image pickup focusing-determination unit 55, an image pickup plate 51, and an image recording/reproducing unit 56.

In this image pickup apparatus, in order to allow an image of an object 52 located near a light axis 9 of the varifocal lens device 50 having a liquid lens 6 to be driven by the actuator 7, 7A or 7B to be image-formed on the image pickup plate 51 as an image 53 of the object, a focused state is determined by the determination unit 55 based upon image pickup signals outputted from the image pickup plate 51. Resulting signals from the determination unit 55 that has determined the focused state are inputted to the actuator drive-controlling unit 54, and based upon the input signals, the actuator drive-controlling unit 54 drive-controls all the actuators 7, 7A, or 7B in synchronism with one another. More specifically, in the case of determining a non-focused state by the determination unit 55, actuator driving signals are inputted to the actuator drive-controlling unit 5 from the determination unit 55, and based upon the input signals, the actuator drive-controlling unit 54 drive-controls all the actuators 7, 7A, or 7B in synchronism with ore another so that the opening member 4 is shifted to advance or retreat in parallel with the direction of the light axis 9; thus, the curvature of the liquid lens 6 is changed so that the position of the focal point 11 is adjusted. In the case of determining a focused state by the determination unit 55, the actuator drive-controlling unit 54 stops driving of all the actuators 7, 7A, or 7B so that the image signal in the focused state is sent from the determination unit 55 to the image recording/reproducing unit 56, and recorded or reproduced by the image recording/reproducing unit 56.

Figure 7C:
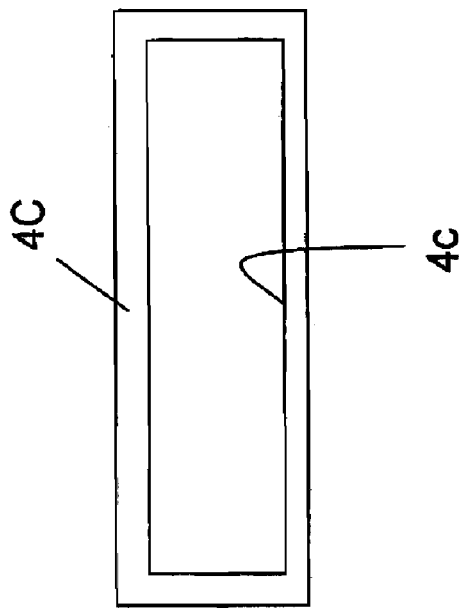
FIG. 7C is a plan view of an opening member having a rectangular shape of the varifocal lens device in accordance with another modified example of the above-mentioned embodiments of the present invention.
Figure 7A:
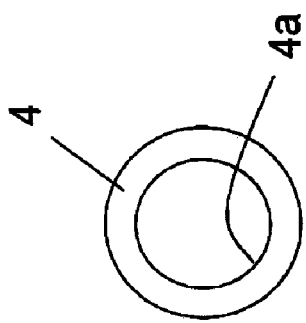
FIG. 7A is a plan view of an opening member of each of the varifocal lens devices in accordance with the first to third embodiments of the present invention.
Figure 7B:
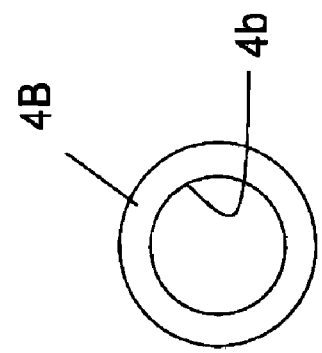
FIG. 7B is a plan view of an opening member having an elliptical shape of the varifocal lens device in accordance with a modified example of the above-mentioned embodiments of the present invention.

Here, in the first to third embodiments, the opening member 4 has been explained as those having a ring shape with a round opening portion 4a as shown in FIG. 7A; and such a liquid lens 6 is useful as, for example, a varifocal lens device for a camera to be mounted on a thin portable terminal, such as a mobile telephone. Moreover, by providing a modified opening portion 4b having an elliptical shape of an elliptical opening member 4E as shown in FIG. 7B, it becomes possible to correct distortion on the peripheral portion of a laterally elongated, image.

Moreover, in the case where a modified opening member 4C having a rectangular shape and a rectangular opening portion 4c as shown in FIG. 7C is prepared, the liquid lens 6 forms a cylindrical lens. Such a lens is useful, for example, as a varifocal lens device for a printer optical system.

By properly combining the arbitrary embodiments of the aforementioned various embodiments, the effects possessed by the embodiments can be produced.

INDUSTRIAL APPLICABILITY

The varifocal lens device of the present invention may be utilized as a device that applies a variable function (optical modulating function) of the focal-point position to various optical apparatuses to be attached to a mobile telephone, a mobile terminal, an electronic paper, or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A varifocal lens device comprising:
a first liquid;
a second liquid that is capable of forming an interface with the first liquid without being mixed with the first liquid, and has a refractive index different from that of the first liquid;
a cell in which the first liquid and the second liquid are sealed;
an opening member that is shiftable in the cell, while being made in contact with the interface between the two liquids, with the interface between the first liquid and the second liquid being remained stationary by an edge portion thereof; and
an actuator that is coupled to the opening member, for controlling a shape of the interface of the two liquids of a liquid lens formed in an opening portion of the opening member by allowing the opening member to shift so that a position of a focal point of the liquid lens is variably controlled.

2. The varifocal lens device according to claim 1, wherein the first liquid is a non-water soluble liquid, the actuator is a polymer actuator of an electric stimulation type, and the polymer actuator of an electric stimulation type is included in the first liquid that is non-water soluble.

3. The varifocal lens device according to claim 2, wherein the first liquid that is non-water soluble is an ionic liquid, and the polymer actuator of an electric stimulation type is an ion driving-type polymer actuator that is driven by incoming and outgoing anions or cations of the ionic liquid.

4. The varifocal lens device according to claim 3, wherein the first liquid that is non-water soluble is ethylmethyl imidazolium-trifluoromethane sulfonyl imide (EMI-TFSI).

5. The varifocal lens device according to claim 2, wherein the second liquid is water soluble, and the second liquid that is water soluble is an aqueous solution of a substance having a specific gravity higher than that of water.

6. The varifocal lens device according to claim 5, wherein the second liquid that is water soluble is an aqueous solution of sodium polytungstate.

7. The varifocal lens device according to claim 1, wherein the actuator is a polymer actuator of an electric stimulation type that has a thin plate shape and executes bending operations.

8. The varifocal lens device according to claim 1, wherein the first liquid, the second liquid, and the opening member have virtually the same density.

9. The varifocal lens device according to claim 8, wherein the opening member is a composite member made of a plurality of members having different densities.

10. The varifocal lens device according to claim 1, wherein the opening member is subjected to a surface treatment for applying water repellency or hydrophilicity thereto.

11. The varifocal lens device according to claim 1, wherein the opening member has a round shape, a plurality of the actuators are disposed alone tangent directions of the round opening member in a point-symmetrical pattern around a light axis of the liquid lens so that all the actuators are drive-controlled in synchronism with one another.

* * * * *

UNITED STATES PATENT AND TRADEMARK OFFICE
CERTIFICATE OF CORRECTION

PATENT NO.        : 7,643,217 B2                                                        Page 1 of 1
APPLICATION NO.   : 12/160125
DATED             : January 5, 2010
INVENTOR(S)       : Kazuo Yokoyama et al.

It is certified that error appears in the above-identified patent and that said Letters Patent is hereby corrected as shown below:

In column 20, claim 11, line 6, "...alone tangent directions..." should read --...along tangent directions...--.

Signed and Sealed this

Eighth Day of June, 2010

David J. Kappos
*Director of the United States Patent and Trademark Office*